(12) United States Patent
Huang

(10) Patent No.: US 7,864,790 B2
(45) Date of Patent: Jan. 4, 2011

(54) METHOD AND APPARATUS FOR IMPROVING THE MANAGEMENT OF DATA PACKETS

(75) Inventor: Jia-Bin Huang, Taipei (TW)

(73) Assignee: Realtek Semiconductor Corp., Hsinchu (TW)

(*) Notice: Subject to any disclaimer, the term of this patent is extended or adjusted under 35 U.S.C. 154(b) by 1180 days.

(21) Appl. No.: 10/709,594

(22) Filed: May 17, 2004

(65) Prior Publication Data

US 2005/0254488 A1 Nov. 17, 2005

(51) Int. Cl.
*H04L 12/56* (2006.01)
(52) U.S. Cl. .......................... 370/412; 370/428
(58) Field of Classification Search .......... 370/229, 370/230, 230.1, 231, 412–416, 428, 429
See application file for complete search history.

(56) References Cited

U.S. PATENT DOCUMENTS

| | | | |
|---|---|---|---|
| 5,943,479 A | 8/1999 | Klein et al. | |
| 6,115,775 A | 9/2000 | Ross et al. | |
| 6,529,986 B1 | 3/2003 | Chen et al. | |
| 6,570,876 B1* | 5/2003 | Aimoto | 370/412 |
| 6,700,887 B1* | 3/2004 | Tsujimoto | 370/389 |
| 7,177,279 B2* | 2/2007 | Kataria | 370/412 |
| 7,320,022 B2* | 1/2008 | Hayter et al. | 709/215 |
| 2003/0223444 A1* | 12/2003 | Lambrecht | 370/412 |
| 2005/0163139 A1* | 7/2005 | Robotham et al. | 370/412 |
| 2007/0091799 A1* | 4/2007 | Wiemann et al. | 370/230 |

* cited by examiner

*Primary Examiner*—Ricky Ngo
*Assistant Examiner*—Pao Sinkantarakorn
(74) *Attorney, Agent, or Firm*—Thomas, Kayden, Horstemeyer & Risley, LLP

(57) ABSTRACT

An apparatus for improving the management of data packets received from a network comprises a receiver for receiving data packets, a first storage unit for storing data packets, a counter for storing a count value, a second storage unit for storing a threshold value, and a comparator for comparing the count value against the threshold value wherein when count value reaches the threshold value, the apparatus issues a first event. A method for improving the management of data packets received from a network comprises receiving a data packet from the network, transferring the data packet into at least one data buffer, monitoring the number of unavailable descriptors, comparing the number of unavailable descriptors with a threshold value, and triggering a first event when the count value reaches the threshold value.

19 Claims, 2 Drawing Sheets

METHOD AND APPARATUS FOR IMPROVING THE MANAGEMENT OF DATA PACKETS

BACKGROUND OF INVENTION

1. Field of the Invention

The invention relates to a network system, and more particularly, to an apparatus and method for improving the management of received data packets.

2. Description of the Prior Art

A network device (e.g., network interfaced card, NIC) receives data packets from a network and transmits data packets from a host system. When a NIC receives a data packet from the network, the NIC will transfer the data packet into a data buffer located in the host system. The host system has a plurality of data buffers with some data buffers being in a "free" state (able to store data packet) and some data buffers being in an "unavailable" state (unable to store data packet). In order to locate a free data buffer, the NIC refers to descriptors. Descriptors are memory structures, which can be located either on the NIC or the host system, that correspond to a data buffer in the host system; a descriptor contains an own bit and the address and buffer length of a data buffer in the host system. Generally, the number of descriptors is a subset of the number of data buffers in the host system. In other words, there are fewer descriptors than data buffers.

The descriptors fall into one of two classes: free descriptors and unavailable descriptors. The free descriptors have corresponding data buffers in a free state and the unavailable descriptors have corresponding data buffers in an unavailable state. By referring to a free descriptor, the NIC is able to transfer a data packet into data buffers in a free state. When a data packet is transferred into the data buffers, the NIC marks the own bit of the corresponding descriptor to unavailable. The own bit of an unavailable descriptor is only marked free by the host system when either the host system clears the data buffer corresponding to the host system or when the host system associates the descriptor with a different data buffer that is in a free state.

The NIC issues an event signal to the host system to indicate what kind of data packet will be transferred into the data buffers. Data packets fall into one of two classes—ok packets and error packets—so naturally the NIC has two signals to represent the packets—an ok signal and an error signal. For example, if the NIC issues an ok signal, then the host system will post the data packet to the protocol stack and associate the descriptor corresponding to the data buffer used to store the data packet with a different data buffer that is in a free state. If the NIC issues an error signal, then the host system will clear the data buffer used to receive the transferred data packet and renew the buffer length of the descriptor corresponding to the data buffer.

Every signal issued by the NIC is allowed to notify the host system. This, however, makes for inefficiency in the management of the data packets received by the host system. For a string of received ok packets, this is not inefficient because the host system needs to address an ok packet as soon as it is received. However, for a string of received error packets, this is highly inefficient because the host system does not need to address an error packet as soon as it is received. For example, if 4 error packets are received in a row, then host system will halt its operations and clear the data buffer 4 times.

A prior art solution counts the number of times an event occurs and notifies the host system via a signal when the number of times an event occurs has reached a certain value. In this way, the prior art solution is able to reduce the number of times the host system interrupts its operations and diverts its resources and power. In the prior art solution, if the number of events counted that triggers the coalesced signal is too high, there is a danger that all the descriptors will be unavailable. With no free descriptors, the NIC will have not be able to obtain the address of a data buffer in a free state in the host system, meaning that the host system will drop the incoming data packets.

Some may argue that prior art will always have free descriptors available so long the number of events counted that triggers the coalesced event is not set to the total number of descriptors. However, this is not true as an error packet that is received may actually occupy more than one data buffer, which means that more than once descriptor will be marked as unavailable. Each packet includes length information. When the length information of the error packet is erroneous, the length of the error packet may exceed the length of the data buffer. As a result, more than one data buffer from the host system is needed, which means more than one descriptor will be marked from free to unavailable.

SUMMARY OF INVENTION

It is therefore one of objectives of the claimed invention to provide an apparatus and related method for improving the management of data packets received from a network by a host system to solve the above-mentioned problem.

According to the claimed invention, an apparatus for improving the management of received data packets of a host system that comprises a plurality of data buffers and a plurality of descriptors that corresponds to a subset of the plurality of data buffers to manage the received data packets, the apparatus comprising: a receiver for receiving a data packet; a first storage unit for storing the data packet from the receiver; a counter for monitoring the number of descriptors in a first state to produce a count value; a second storage unit for storing a threshold value; a comparator for comparing the count value with the threshold value and producing a comparison signal; and a control logic for issuing a first event to the host system according to the comparison signal.

According to the claimed invention, a method for improving the management of received data packets of a host system that comprises a plurality of data buffers and a plurality of descriptors that corresponds to a subset of the data buffers to manage the received data packets, the method comprising: receiving a data packet; transferring the data packet into at least one of the data buffers; monitoring an amount of the descriptors in a first state; comparing the amount with a threshold value to generator a comparison signal; and generating a first event to the host system according to the comparison signal to prevent all the descriptors from being in the first state.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
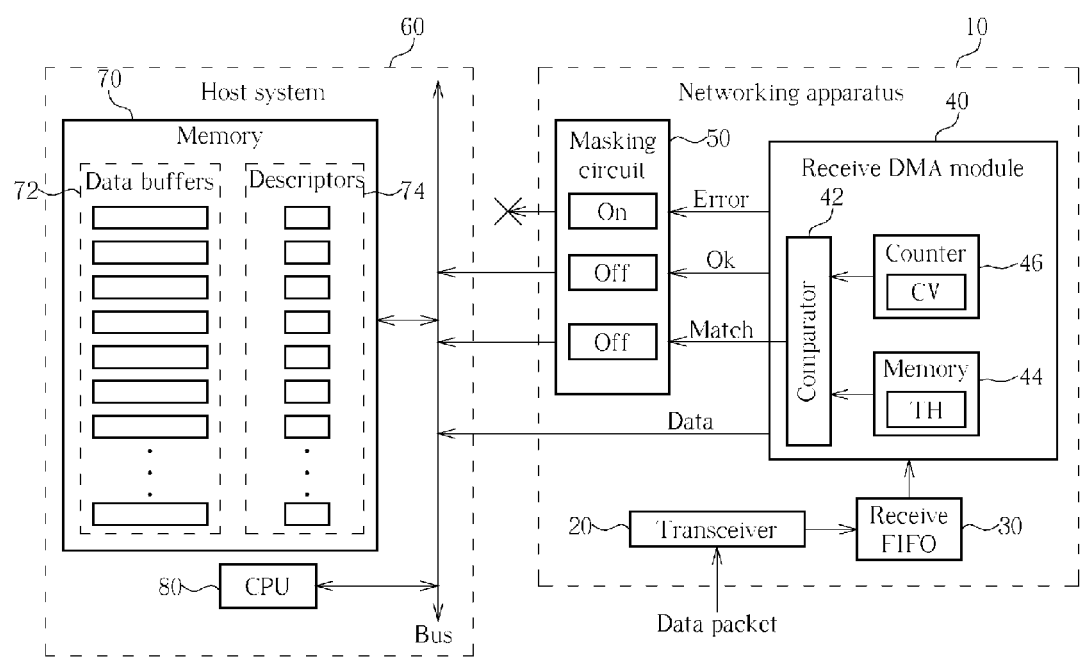
FIG. 1 is a block diagram of an apparatus according to the present invention.

FIG. 1 is a block diagram of an apparatus according to the present invention. In this embodiment, the apparatus 10 comprises a transceiver 20 for receiving data packets, a first storage unit 30 for storing a data packets from the transceiver, a Receive DMA 40 for transferring data packets from the first storage unit 30 into the data buffers 72, a counter 46 for monitoring the number of descriptors in a certain state starting from the initial value, a second storage unit 44 for storing a threshold value that indicates the count value that should cause the apparatus to trigger a first event, a comparator 42 for comparing the count value against the threshold value, and a masking circuit 50 for masking signals from notifying the host system when the masking circuit is on. The apparatus 10 is coupled to a host system 60 via a bus. The host system 60 comprises a memory 70 and CPU 80. The memory 70 comprises data buffers 72 and descriptors 74.

The comparator 42, second storage unit 44, and counter 46 are not necessarily limited to being positioned within the receive DMA 40, but is only shown so as an example embodiment. Also, the masking circuit 50 is an optional component of the apparatus 10 and should not be taken as a limitation.

Figure 2:
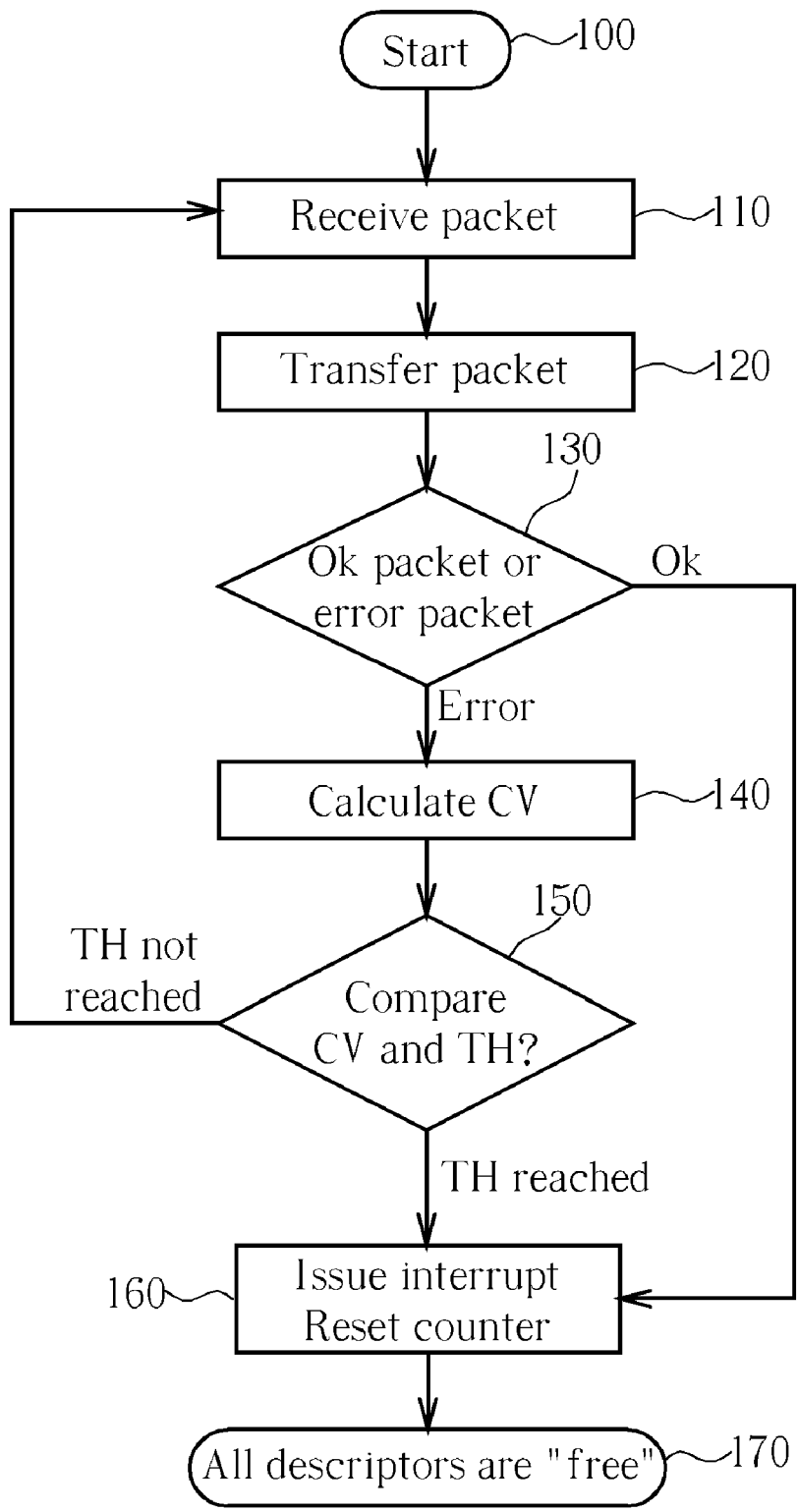
FIG. 2 is a flow chart of a method employed by an apparatus according to FIG. 1.

Please refer to FIG. 2. FIG. 2 is a flow chart of a method employed by an apparatus 10 according to FIG. 1. The method comprises the following steps:

Step 100: Start.

Step 110: The transceiver 20 receives a data packet from the network and stores the data packet in the FIFO 30.

Step 120: The receive DMA 40 transfers the data packet from the FIFO 30 to at least one of data buffers 72 of the host system 60.

Step 130: If the data packet is an ok packet, generate an ok packet interrupt to a host system 60 and go to step 160. If the data packet is an error packet, go to step 140.

Step 140: The counter 46 monitors the number of descriptors 74 in the unavailable state to produce a count value CV. The number of descriptors 74 that change from free to unavailable correspond to the number of data buffers 72 that become inaccessible to the NIC 10. The counter 46 is incremented according to the number of descriptors that change from free to unavailable.

Step 150: The comparator 42 compares the count value CV of the counter 46 and the threshold value TH of the threshold memory 44. If the CV has reached the TH, go to step 160. If the CV has not reached the TH, return to step 110. Note that the threshold value is programmable.

Step 160: Because the CV has reached the TH, the NIC 10 issues a match interrupt to the host system 60, and resets the counter 46 to an initial value.

Step 170: All unavailable descriptors are marked free by the host system.

When the Receive DMA 40 transfers a data packet into a data buffer 72, the NIC 10 must obtain information about the data buffer 72 from a descriptor 74 corresponding to that data buffer 72. When the information is obtained, the NIC 10 marks the own bit of the corresponding descriptor 74 and its state goes from free to unavailable. Also, please remember that a single data packet may be so long that it requires two or more data buffers 72 to store the data packet. As a result, the number of descriptors that have their state changed from free to unavailable is determined in Step 120.

In Step 150, Because the CV has reached the TH, it means that the number of unavailable descriptors 74 is at a level that is no longer acceptable for the NIC 10; remember the number of free descriptors 74 corresponds to the number of data buffers 72 the NIC 10 has access. Therefore, the NIC 10 in Step 160 issues a match signal to the host system 60. Because the masking circuit 50 is off with regards to the match signal, the match signal sent from the comparator 42 is able to notify the host system 60. The host system 60 as a result clears the data buffers 72 that correspond to the descriptors 74 in an unavailable state. By clearing the data buffers 72, it means that the number of free descriptors returns to the original number. As a result, in Step 160, the NIC 10 also resets the value of the counter 46 to an initial value.

Please note the following. In the preferred embodiment explained in the specification, the counter tracks the number of unavailable descriptors 74. However, the counter 46 could just as easily track the number of free descriptors 74 remaining. In this case, instead of counting up, the counter 46 counts down. Also, note that even though a masking circuit 50 is depicted in FIG. 1, the masking circuit is not necessarily required and therefore, should not be taken as a limitation. As stated previously, most host systems 60 would like to be notified as soon as possible when an ok packet is received, and even though the error signal is blocked from notifying the CPU 80 of the host system 60, there are other parts of the NIC 10 or host system that would like to track the number of error packets received. Therefore, a masking circuit 50 is employed to allow the ok signal to pass through to the CPU 80 but not the error signal. One final note, the comparator 42, threshold memory 44, and counter 46 are not limited to being positioned within the Receive DMA module 40.

As one can see, the present invention clearly has advantages over the prior art. Because the prior art coalesces events but an error packet event may cause more than one descriptor to be changed, the prior art is suspect to dropping packets, and therefore, negatively effect the host system's management of received data packets from a network. Therefore, the present invention is able to improve the host system's management of received data packets from a network.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An apparatus for improving the management of received data packets of a host system that comprises a plurality of data buffers and a plurality of descriptors that corresponds to a subset of the plurality of data buffers to manage the received data packets, the apparatus comprising:

a receiver for receiving a data packet;

a first storage unit for storing the data packet from the receiver;

a counter for counting a number of descriptors in a first state to produce a count value;

a second storage unit for storing a threshold value;

a comparator for comparing the count value with the threshold value and producing a comparison signal; and a masking circuit, for blocking an error signal which indicates the data packet is an error data packet until the count value reaches the threshold value;

wherein the apparatus issues a first event to the host system according to the comparison signal.

2. The apparatus of claim 1 further comprising a Receive DMA (direct memory address) for transferring the data packet from the first storage unit into the data buffers.

3. The apparatus of claim 2 wherein the counter, the second storage unit, and the comparator are positioned within the Receive DMA module.

4. The apparatus of claim 1 wherein the first event indicates that data buffers corresponding to the descriptors should be cleared.

5. The apparatus of claim 1 wherein the first state is an unavailable state.

6. The apparatus of claim 1 wherein the threshold value is programmable.

7. The apparatus of claim 1 wherein the first state is a free state.

8. The apparatus of claim 1 wherein the apparatus issues a second event when the data packet is an ok packet.

9. The apparatus of claim 8 wherein the data buffers corresponding to the descriptors are cleared when the first event or the second event is issued.

10. The apparatus of claim 1, wherein the apparatus is a wireless network device.

11. The apparatus of claim 1 wherein the counter monitors the number of the descriptors in the first state to produce the count value when the apparatus continuously receives a plurality of error data packets; wherein the counter is reset when the data packet is an ok data packet.

12. A method for improving the management of received data packets of a host system that comprises a plurality of data buffers and a plurality of descriptors that corresponds to a subset of the data buffers to manage the received data packets, the method comprising:
    receiving a data packet;
    transferring the data packet into at least one of the data buffers;
    counting an amount of the descriptors in a first state;
    comparing the amount with a threshold value to generate a comparison signal; and
    generating a first event to the host system according to the comparison signal and based on whether a masking circuit is engaged, wherein generating the first event is performed to prevent all the descriptors from being in the first state, and wherein the masking circuit is engaged if the data packet is an error data packet.

13. The method of claim 12 wherein the first state is an unavailable state.

14. The method of claim 12 wherein the threshold value is programmable.

15. The method of claim 12 wherein the first state is a free state.

16. The method of claim 12 further comprising:
    generating a second event when the data packet is an ok packet.

17. The method of claim 15 wherein the data buffers corresponding to the descriptors are cleared when the first event or the second event is generated.

18. The method of claim 12 wherein the amount of the descriptors in the first state is monitored when a plurality of error data packets are continuously received.

19. A method for improving the management of data packets received from a network by a host system that comprises a plurality of data buffers and that utilizes a plurality of descriptors that corresponds to a subset of the plurality of data buffers to manage the data packets received from the network, the method comprising:
    receiving a data packet from the network;
    transferring the data packet into at least one of the data buffers;
    counting a number of descriptors that will have their state changed when the data packet is transferred;
    calculating a count value according to the number of descriptors that will have had their state changed by the data packet being transferred; and
    comparing the count value with a threshold value, and triggering a first event to the host system when the count value reaches the threshold value and based on whether a masking circuit is engaged;
    wherein the first event notifies the host system to clear the data buffers corresponding to the descriptors, and wherein the masking circuit is engaged if the data packet is an error data packet.

* * * * *